(12) United States Patent
Wienold et al.

(10) Patent No.: US 7,995,963 B2
(45) Date of Patent: Aug. 9, 2011

(54) METHOD AND SYSTEM FOR TARIFF, LOAD AND METER DATA MANAGEMENT WITH RADIO RIPPLE CONTROL

(75) Inventors: Heinrich Wienold, Munich (DE); Roland Bicker, Dachau (DE); Gabriel Rupprecht, Oerlinghausen (DE)

(73) Assignee: EFR Europaische Funk-Rundsteurung GmbH, Munich (DE)

( * ) Notice: Subject to any disclaimer, the term of this patent is extended or adjusted under 35 U.S.C. 154(b) by 451 days.

(21) Appl. No.: 12/339,677

(22) Filed: Dec. 19, 2008

(65) Prior Publication Data

US 2009/0163136 A1 Jun. 25, 2009

(30) Foreign Application Priority Data

Dec. 20, 2007 (EP) .................................... 07024842

(51) Int. Cl.
*H04H 20/71* (2008.01)
(52) U.S. Cl. ........................ 455/3.05; 370/310
(58) Field of Classification Search ................ 455/12.1, 455/13.1, 3.02, 427, 437, 436, 428, 430; 370/310; 709/227
See application file for complete search history.

(56) References Cited

U.S. PATENT DOCUMENTS

| | | | | |
|---|---|---|---|---|
| 5,448,623 | A * | 9/1995 | Wiedeman et al. | 455/430 |
| 5,655,005 | A * | 8/1997 | Wiedeman et al. | 370/320 |
| 5,742,908 | A * | 4/1998 | Dent | 455/517 |
| 6,954,144 | B1 | 10/2005 | Kiser et al. | |
| 7,711,320 | B2 * | 5/2010 | Monte et al. | 455/12.1 |
| 7,792,487 | B2 * | 9/2010 | Monte et al. | 455/12.1 |

FOREIGN PATENT DOCUMENTS

| | | |
|---|---|---|
| DE | 10 2004 053 709 A1 | 5/2006 |
| WO | WO-02/37227 A2 | 5/2002 |
| WO | WO-03/084278 A1 | 10/2003 |

OTHER PUBLICATIONS

European Search Report dated Jun. 10, 2008. EP Application No. 07 024 842.2.

* cited by examiner

*Primary Examiner* — Lam T Mai
(74) *Attorney, Agent, or Firm* — Gifford, Krass, Sprinkle, Anderson & Citkowski, P.C.

(57) ABSTRACT

The invention relates to a method for the management of a plurality of decentralized customer terminals by means of a bidirectional communications connection between a central unit and customer connection units associated with the customer terminals, wherein the central unit transmits at least one synchronous radio control program to a plurality of customer connection units by means of at least one longwave transmitter via a central radio ripple control channel, wherein each customer connection unit triggers a predefined process at least one associated customer terminal in dependence on the received radio control telegram, and wherein each customer connection unit transmits at least one data telegram which includes information related to the associated customer terminal to the central unit via a decentralized return channel which is separate from the radio ripple control channel; wherein the transmission of the data telegram to the control unit takes place based on time, based on an event and/or in dependence on a previously received radio control telegram. The invention furthermore relates to a management system for a plurality of customer terminals which is operable in accordance with the method in accordance with the invention.

17 Claims, 1 Drawing Sheet

METHOD AND SYSTEM FOR TARIFF, LOAD AND METER DATA MANAGEMENT WITH RADIO RIPPLE CONTROL

CROSS-REFERENCE TO RELATED APPLICATIONS

This application claims the benefit of European Patent No. 07 024 842.2, filed Dec. 20, 2007, which is incorporated herein by reference.

FIELD OF THE INVENTION

The present invention relates to a method for the management of a plurality of decentralized customer terminals by means of a bidirectional communications connection between a central unit and customer connection units associated with the customer terminals.

BACKGROUND OF THE INVENTION

It is necessary in various areas of the art to transmit control signals from a central device to a plurality of decentrally distributed customer terminals. In the field of energy supply load management or tariff management can e.g. be carried out in that control signals for the tariff adjustment or for switching off are transmitted to specific terminals. This can take place, for example, by means of data transmission via the power network (powerline communication, PLC). The method of longwave based radio ripple control, which is described, for example in EP 1 479 260 B1, can also be used for this purpose. On a tariff change to be carried out for all customer terminals or for a subgroup thereof or on a switching on or off of individual devices associated with the terminals within the framework of load management, it is necessary that the corresponding control instructions are implemented within a relatively short time, for example in the range below ten seconds.

Conversely, it can also be desired to receive signals from the customer terminals at the central device. There are currently, for example, increased efforts to introduce the automated measurement of power consumption (smart metering) in the area of private households. The individual consumption data have to be transmitted in a manner secure against interception, secure against manipulation and with high reliability. For reasons of economy and due to legal radiation restrictions, it is generally not desired to provide a high performance transmission device at each of the numerous customer terminals to transmit the data to the central device. Existing systems for the management of a plurality of customer terminals are therefore disadvantageous either with respect to the transmission rate, the response behavior, the data security or the system costs and cannot, for example, effect an efficient management of load, tariff or consumption for wide distribution of terminals.

It is thus the object of the invention to enable such efficient management for a large number of terminals.

This object is satisfied by a method having the features of claim 1 as well as by a management system which can be operated in accordance with the method.

SUMMARY OF THE INVENTION

In accordance with the invention, the central unit transmits at least one synchronous radio control telegram to a plurality of customer connection units by means of at least one longwave transmitter via a central radio ripple control channel. Each customer connection unit triggers a predefined process at least one associated customer terminal in dependence on the received radio control telegram. Each customer connection unit furthermore transmits at least one data telegram which includes information related to the associated customer terminal to the central unit via a decentralized return channel which is separate from the radio ripple control channel. The transmission of the data telegram to the control unit takes place based on time, based on an event and/or in dependence on a previously received radio control telegram.

Due to the provision of a central radio ripple control channel, the central unit can control a plurality of the customer terminals in a synchronized manner without any real delay times having to be expected between the transmission and the reception. The customer terminals can transmit data to the central unit by means of the decentralized return channel in a simple, secure flexible and cost-saving manner, for example, via a PLC system which is simple to implement. It is thus e.g. possible that the central unit triggers a coordinated consumption data logging at numerous terminals at a fixed time and receives the corresponding data bit by bit to process them further at a later time.

The principle of the radio ripple control which is in particular characterized by its centralized structure and its speed and the principle of a data transmission which is, in contrast thereto, decentralized and in which speed and synchronization are not important are thus advantageously linked to one another by the invention. The particular advantage of this linking can be seen in that just the advantages of the systems are utilized and any disadvantages of the systems are not important.

Possible further developments of the invention are set forth in the dependent claims, in the description and in the drawing.

The decentralized return channel is advantageously based on the networks or protocols PLC, GSM, GPRS, UMTS, TCP and/or IP. These existing communications standards or the associated already existing infrastructure can be utilized in an advantageous manner and establish compatibility to other applications.

In accordance with an expedient aspect of the invention, the decentralized return channel is based on at least on cellular radio network. Tailored and flexible communication structures can be set up by means of such radio networks.

The transmission of the data telegram via the decentralized return channel is preferably made insensitive with respect to interference signals by means of a correlation process. This procedure makes it possible to operate the transmission devices of the customer connection units with relatively low power.

In accordance with an embodiment of the invention, the transmission of the radio control telegram via the central radio ripple control channel is made insensitive with respect to interference signals by means of a correlation process. The robustness of the signal transmission via the central radio ripple channel can thereby be increased. Such processes have proven themselves in radio astronomy even with an extremely high interference environment. This process therefore enables an increase in the reliability and/or the increase of the range of the longwave transmitter. The currently known technique using FSK modulation is today not so much limited by the reception resolution of the receivers used (input noise), but rather largely by the signal-to-noise ratio. High levels have therefore been selected as limit values which are reliably above the levels of the interference surroundings. This limit can be considerably corrected downwardly using the means of correlation, which enables a better range or a better reception at difficult locations, e.g. in switch cabinets.

The synchronous radio control telegram preferably includes control instructions with high time priority. The advantages of the fast radio ripple control can thereby be utilized to a special degree.

The radio control telegram particularly preferably additionally includes information data. Specific information only relevant to one customer terminal, for example contract information, or information equally relevant to a plurality of customer terminals, for example a time signal, tariff information, weather data, alarm signals and the like can thus also be transmitted to the customer connection units.

In accordance with a preferred embodiment of the invention, the transmission of the data telegram from the customer connection units to the central unit takes place with a time delay with respect to the radio control telegram previously received by the customer connection units. The delay time can, for example, be adapted to a specific application case, whereas a synchronized triggering of the data transmission is still ensured by means of the synchronous radio control telegram.

The data of the data telegram are preferably logged in response to a received radio control telegram and are stored in a memory device associated with the respective customer terminal until the transmission to the central unit, with a time stamp being added to the logged data which enables a subsequent time association of the data. This procedure draws a special benefit from the high redundancy and reliability of the system and method in accordance with the invention, whereby substantial central tasks can be controlled independently of the properties and of the availability of the return channel. In particular the reorganization of all the data onto a system clocked synchronously by an atomic clock thus also becomes possible independently of whether the return channel works or not. An association of the consumption exact to the minute can thus also be made possible after months or years with static memory systems of low cost at present. The reliability of a billing system which does not only make use of a working system, can thus be increased by a multiple and latencies in the range of months can be bridged.

Management of load, tariff, consumption and/or information including the customer terminals or devices associated with the customer terminals is preferably carried out by means of the central radio ripple control channel and the decentralized return channel. Such integrated management opens up a variety of options for efficient and economical operation for the operator of a terminal network.

An expedient aspect of the invention provides that the customer terminals or devices associated with the customer terminals are switched on or off on the basis of the synchronous radio control telegram.

A display device, in particular an optical display device, provided at the customer terminal for the representation of information related to the customer terminal is preferably activated or updated in dependence on the received radio control telegram. This, for example, provides the possibility of informing a customer regularly of his current consumption data and so of giving him the opportunity to check and/or to change his consumption behavior.

In accordance with a preferred embodiment of the invention, the customer terminals include consumption logging devices, power logging devices and/or switching devices for supply devices such as electrical supply devices, water supply devices and heat supply devices. The logging devices can, for example, be electricity meters for domestic power connections, wherein management in accordance with the invention provides the requirements for efficient smart metering.

The synchronous radio control telegram preferably triggers a time-synchronized logging, in particular a power data logging, at the customer terminals. A time-synchronized power data logging ensures that none of the customers is disadvantaged with respect to different tariff periods or billing intervals.

In accordance with a preferred embodiment, the synchronous radio control telegram triggers a tariff change at the customer terminals. It is thereby e.g. possible to fix an up-to-the-minute electricity price and to change the settings at the electricity meter with respect to this in a corresponding manner. Up-to-the-minute purchasing prices of the energy service provider can thus be reflected directly at the customer side and corresponding products offered.

In accordance with an expedient aspect of the invention, the synchronous radio control telegram triggers a switch-off within the framework of load management at the customer terminals or at devices associated with the customer terminals. A direct switching off of individual consumers can thereby be initiated by an energy supply company, for example on an impendent overload of the grid, in order thus to prevent a collapse of the whole grid. The switching off can in this respect also be made dependent on previously given feedback of the corresponding customer connection unit.

BRIEF DESCRIPTION OF THE DRAWINGS

The invention will be described in the following by way of example with reference to the drawing.

DETAILED DESCRIPTION OF THE PREFERRED EMBODIMENTS

Figure 1:
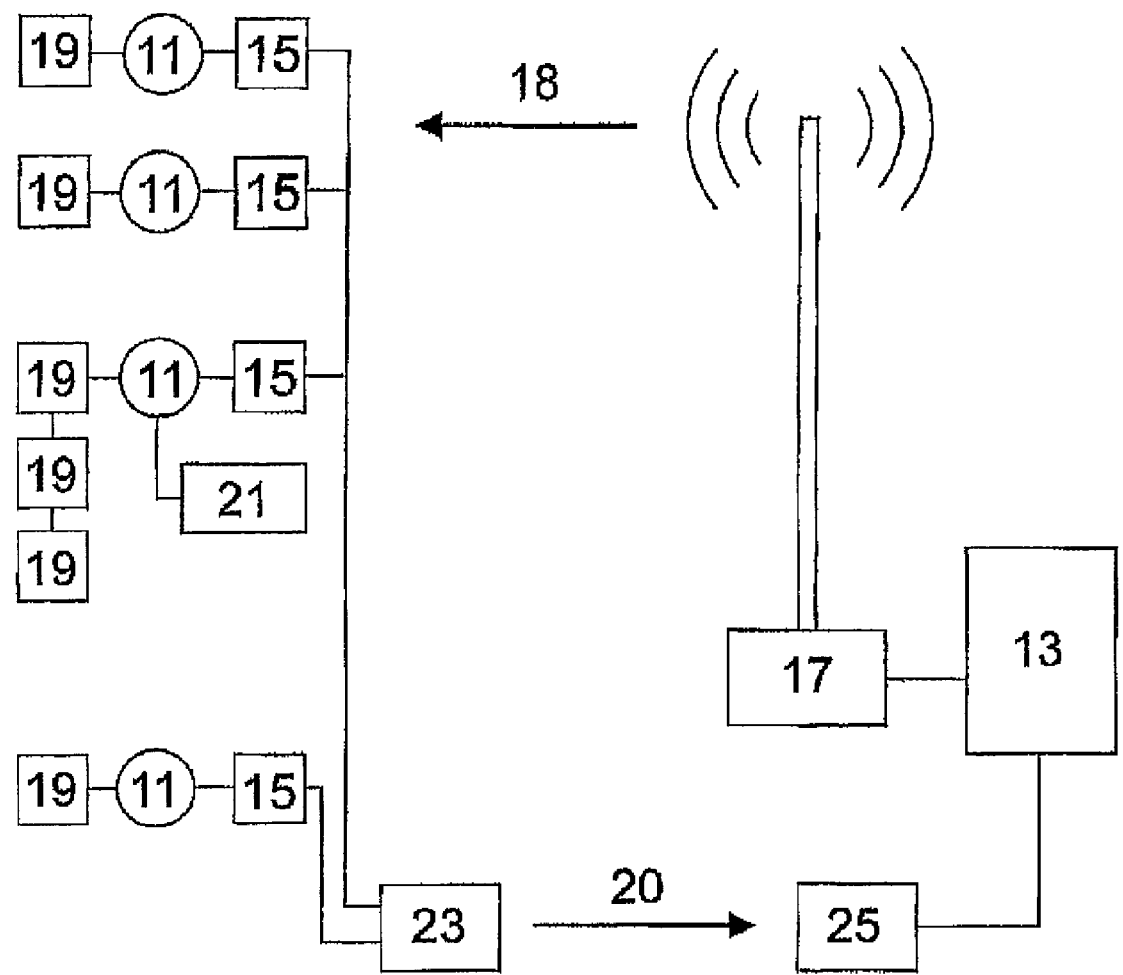
FIG. 1 is a schematic representation of a management system in accordance with the invention.

The management system shown in FIG. 1 includes a central unit 13 with which a longwave transmitter 17 and a reception device 25 are associated. In this respect, a plurality of longwave transmitters can also be associated with one central unit and it is also possible to provide a plurality of central units. The central unit 13 controls a plurality of decentralized customer terminals 11 via customer connection units 15 associated therewith. The customer connection units 15 are provided for this purpose with reception devices, not shown, which are tuned to the longwave transmitter 17. The customer terminals 11 can be electricity meters, gas meters or water meters. It is also possible that a respective plurality of customer terminals 11, for example one meter each for the electricity connection, the gas connection and the water connection, are each associated with one customer connection unit 15. The consumption devices, which can be electrical consumers, street lighting systems, heating devices or the like, associated with the customer terminals 11 are marked by 19 in the FIGURE. Some or all of the customer terminals 11 can be provided with a display device 21, for example with a monitor or an LED display to show information related to the respective customer terminal 11.

The centrally organized management of the network or of the distribution of customer terminals 11 takes place via a bidirectional communications connection between the central unit 13 and the customer connection units 15, with the central unit 13 transmitting synchronous radio control telegrams 18 to the customer connection units 15 by means of a longwave-based radio ripple control process. The central unit 13 can in this respect transmit a radio control telegram 18 which is received by each customer connection unit 15 or it can transmit a radio control telegram 18 to a specific subgroup of the customer connection units 15 in that e.g. the radio control telegram 18 is preceded by a corresponding code or in that the wavelength of the transmitted signal is adapted to the reception devices of the subgroup.

Each customer connection unit 15 triggers a predefined procedure at least one associated customer terminal 11 in dependence on the received radio control telegram 18. Furthermore, each customer connection unit 15 transmits at least one data telegram 20 to the central unit 13 via a return channel. The transmission of the data telegram 20 to the central unit 13 can take place on a time basis, that is e.g. at predefined times based on a clock associated with the respective customer terminal 11 or with the respective customer connection unit 15. Alternatively, the transmission of the data telegram 20 can also take place on an event basis, for example on the occurrence of a fault. It is also possible that the transmission of the data telegram 20 takes place in dependence on a previously received radio control telegram radio control telegram 18, in particular a directly previously received radio control telegram, and thus represents feedback, in particular prompt feedback, of the respective customer connection unit 15.

The return channel is organized decentrally and is separate from the radio ripple control channel. It can be based on the existing infrastructure of a PLC network. Alternatively or additionally, different transmission forms, e.g. GSM, GPRS, UMTS, TCP, IP or a combination thereof can also be used for the decentralized return channel. It is also possible to use a cellular radio network (mesh radio) for the decentralized return channel. The precise configuration of the return channel is not decisive since no critical parameters have to be satisfied with respect to the data rate or to the transmission time and the required simultaneity of the control is ensured by the central radio ripple control. To ensure data protection with respect to personal consumption data, the data telegrams (20) are preferably transmitted in coded form. Furthermore, the transmission of the data telegrams (20) via the decentralized return channel is made insensitive with respect to interference signals by means of a suitable correlation process. This is possible without problem since the bandwidth of the data transmission from the customer connection units 15 to the central unit 13 is usually small. On a reading of a meter, it can, for example, be sufficient to log the data once a month.

In the exemplary configuration shown, the customer connection units 15 transmit the information data to an intermediate station 23. As shown, the customer connection units 15 can be in direct communication with the intermediate station 23 or via one or more other customer connection units 15. The intermediate station 23 transmits the information data to the reception device 25 of the central unit 13. Alternatively, it is also possible that the customer connection units 15 are in direct communication with the reception device 25 without using an intermediate station. This in particular applies in the case of a return channel based on GSM, GPRS or UMTS.

It is furthermore also possible to execute the decentralized return channel bidirectionally based on the networks or protocols PLC, GSM, GPRS, UMTS, TCP and/or IP. A redundant communications connection is provided in this way for the availability of the customer connection units 15 in addition to and independent of the central radio ripple control channel.

Integrated management of load, tariff, consumption and/or information can in particular be carried out by means of the system shown with respect to the devices 19. For example, a consumption data detection of the customer terminals 11 is triggered by transmission of a radio control telegram 18 at a preset time. The central unit can have access to a time normal and the radio control telegram 18 can be coupled to the corresponding signals so that a data reading coordinated exactly in time results. All the customer terminals 11 log the instantaneous consumption data of the corresponding devices 19 on the bass of the radio control telegram 18. The respective data are then transmitted via the decentralized return channel to the intermediate station 23 and further to the reception device 25 of the central unit 13. The central unit 13 takes over the further processing, backing up and preparation of the data. The further processing of the data in the central unit 13 can take place significantly later than the reading, for example only on the issuing of a bill. The radio control telegram 18 which triggers the logging or a radio control telegram 18 which is separate therefrom and which is transmitted at a later data can also in each case include additional information data which are processed by the customer terminals 11. It can, for example, be important for a customer terminal 11 to receive a time signal or to be supplied with up-to-date weather information. Provided that the customer terminal 11 has a displace device 21, the received information data and/or further internal data can be displayed on the display device.

Provided that the customer terminals 11 are switching devices, active load management can be realized by selective switching on or off. On an impending overload of the total network, the central unit 13 transmits a control telegram 18 to specific customer connection units 15 to initiate a switch-off of the respective device 19 via the associated customer terminal 11. It is also possible that the switching off is made dependent on previous feedback of the respective customer connection unit 15. The central unit 13 transmits via the radio control telegram 18, for example, the message that a further operation of the corresponding device 19 is only possible at a higher tariff. The connection device 15 associated with the respective customer terminal 11 then reports to the central unit 13 via the decentralized return channel whether a further operation of the device 19 at a higher tariff can be considered. Such load management is in particular suitable for smaller combined power station units (virtual power station).

In a similar manner, a change of tariff can be triggered in a plurality of customer terminals 11 by a single synchronized radio control telegram 18. The customer can always be informed in real time of his then current consumption data and the instantaneously valid tariff by means of the display apparatus 21.

It is therefore possible in accordance with the invention to provide integrated management of load, tariff, consumption, data and production (wind power plants, virtual power stations, fuel cells, small power stations) for large-area, decentralized distributions or networks such as the network of private electricity customers using the principles described on the basis of already existing and tried and tested infrastructure.

It is equally possible to make the data prepared in the central unit 13 accessible to customers for information purposes, for example via an internet portal.

The invention claimed is:

1. A method for the management of a plurality of decentralized customer terminals (11) by means of a bidirectional communications connection between a central unit (13) and customer connection units (15) associated with the customer terminals (11), wherein the central unit (13) transmits at least one synchronous radio control telegram (18) to a plurality of customer connection units (15) by means of at least one longwave transmitter (17) via a central radio ripple control channel;

wherein each customer connection unit (15) triggers a predefined process at at least one associated customer terminal (11) in dependence on the received radio control telegram (18);

wherein each customer connection unit (15) transmits at least one data telegram (20) which includes information related to the associated customer terminal (11) to the central unit (13) via a decentralized return channel which is separate from the radio ripple control channel; and wherein the transmission of the data telegram (20) to the control unit (13) takes place based on time, based on an event and/or in dependence on a previously received radio control telegram (18).

2. A method in accordance with claim 1, characterized in that the decentralized return channel is based on the networks or protocols PLC, GSM, GPS, UMTS, TCP and/or IP.

3. A method in accordance with claim 1, characterized in that the decentralized return channel is based on at least one cellular radio network.

4. A method in accordance with claim 1, characterized in that the transmission of the data telegram (20) via the decentralized return channel is made insensitive with respect to interference signals by means of a correlation process.

5. A method in accordance with claim 1, characterized in that the transmission of the radio control program (18) via the central radio ripple control channel is made insensitive with respect to interference signals by means of a correlation process.

6. A method in accordance with claim 1, characterized in that the synchronous radio control program (18) includes control instructions with high time priority.

7. A method in accordance with claim 1, characterized in that the synchronous radio control telegram (18) additionally includes information data.

8. A method in accordance with claim 1, characterized in that the transmission of the data telegrams (20) by the customer connection units (15) to the central unit (13) takes place with a time delay with respect to the radio control telegram (18) previously received by the customer connection units (15).

9. A method in accordance with claim 8, characterized in that the data of the data telegram (20) are logged in response to a received radio control telegram (11) and are stored in a memory device associated with the respective customer terminal (11) until the transmission to the central unit (13), with a time stamp being added to the logged data which enables a subsequent time association of the data.

10. A method in accordance with claim 1, characterized in that management of load, tariff, consumption and/or information including the customer terminals (11) or devices (19) associated with the customer terminals (11) is carried out by means of the central radio ripple control channel and the decentralized return channel.

11. A method in accordance with claim 1, characterized in that the customer terminals (11) or devices (19) associated with the customer terminals (11) are switched on or off in dependence on the synchronous radio control telegram (18).

12. A method in accordance with claim 1, characterized in that a display device (21), in particular an optical display device, provided at the customer terminal (11) for the display of information related to the customer terminal (11) is activated or updated in dependence on the received radio control telegram (18).

13. A method in accordance with claim 1, characterized in that the customer terminals (11) include power logging devices and/or switching devices for supply devices such as electrical supply devices, water supply devices and heat supply devices.

14. A method in accordance with claim 1, characterized in that the synchronous radio control telegram (18) triggers a time-synchronized data logging, in particular a power data logging, in the customer terminals (11).

15. A method in accordance with claim 1, characterized in that the synchronous radio control telegram (18) triggers a change in tariff at the customer terminals (11).

16. A method in accordance with claim 1, characterized in that the synchronous radio control telegram (18) triggers a switching off or a switching on within the framework of load management in the customer terminals (11) or the devices (19) associated with the customer terminals (11).

17. A management system for a plurality of customer terminals (11) which is operable in accordance with a method for the management of a plurality of decentralized customer terminals (11) by means of a bidirectional communications connection between a central unit (13) and customer connection units (15) associated with the customer terminals (11), wherein the central unit (13) transmits at least one synchronous radio control telegram (18) to a plurality of customer connection units (15) by means of at least one longwave transmitter (17) via a central radio ripple control channel;

wherein each customer connection unit (15) triggers a predefined process at at least one associated customer terminal (11) in dependence on the received radio control telegram (18);

wherein each customer connection unit (15) transmits at least one data telegram (20) which includes information related to the associated customer terminal (11) to the central unit (13) via a decentralized return channel which is separate from the radio ripple control channel; and wherein the transmission of the data telegram (20) to the control unit (13) takes place based on time, based on an event and/or in dependence on a previously received radio control telegram (18).

* * * * *